Feb. 21, 1939.  W. H. BASELT  2,148,365
BRAKE ARRANGEMENT
Filed Dec. 9, 1936   2 Sheets-Sheet 1
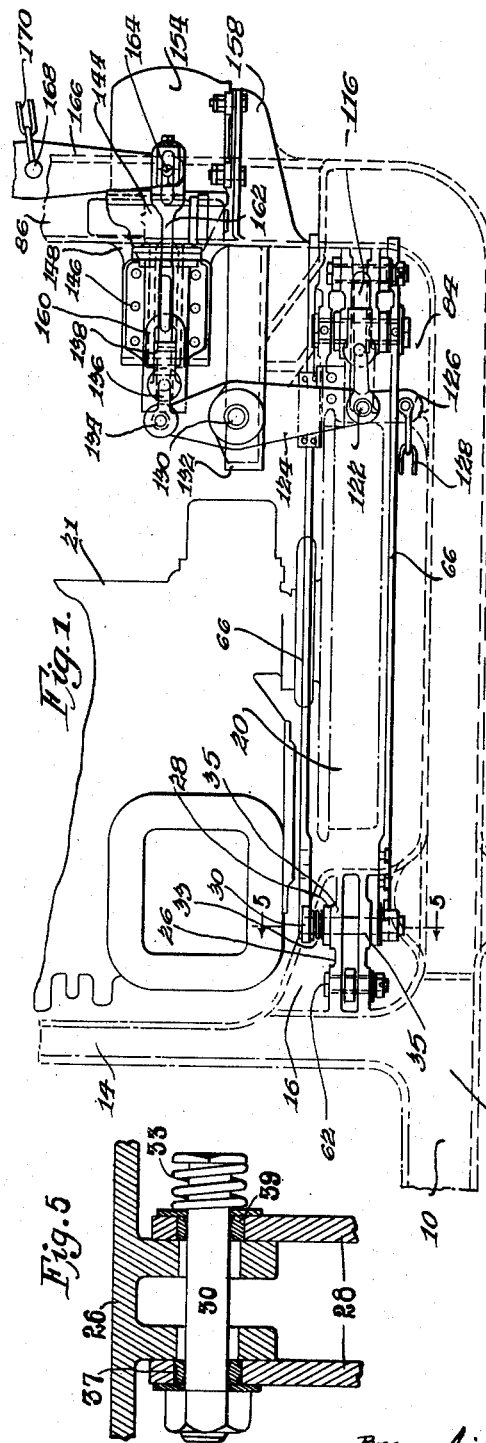
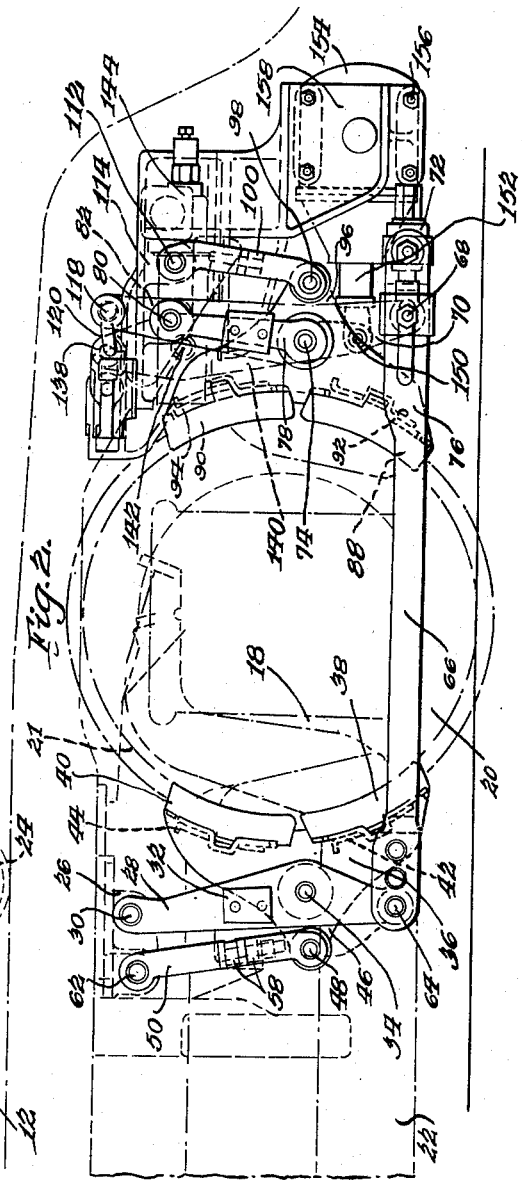
Inventor
Walter H. Basett Feb. 21, 1939.  W. H. BASELT  2,148,365
BRAKE ARRANGEMENT
Filed Dec. 9, 1936  2 Sheets-Sheet 2
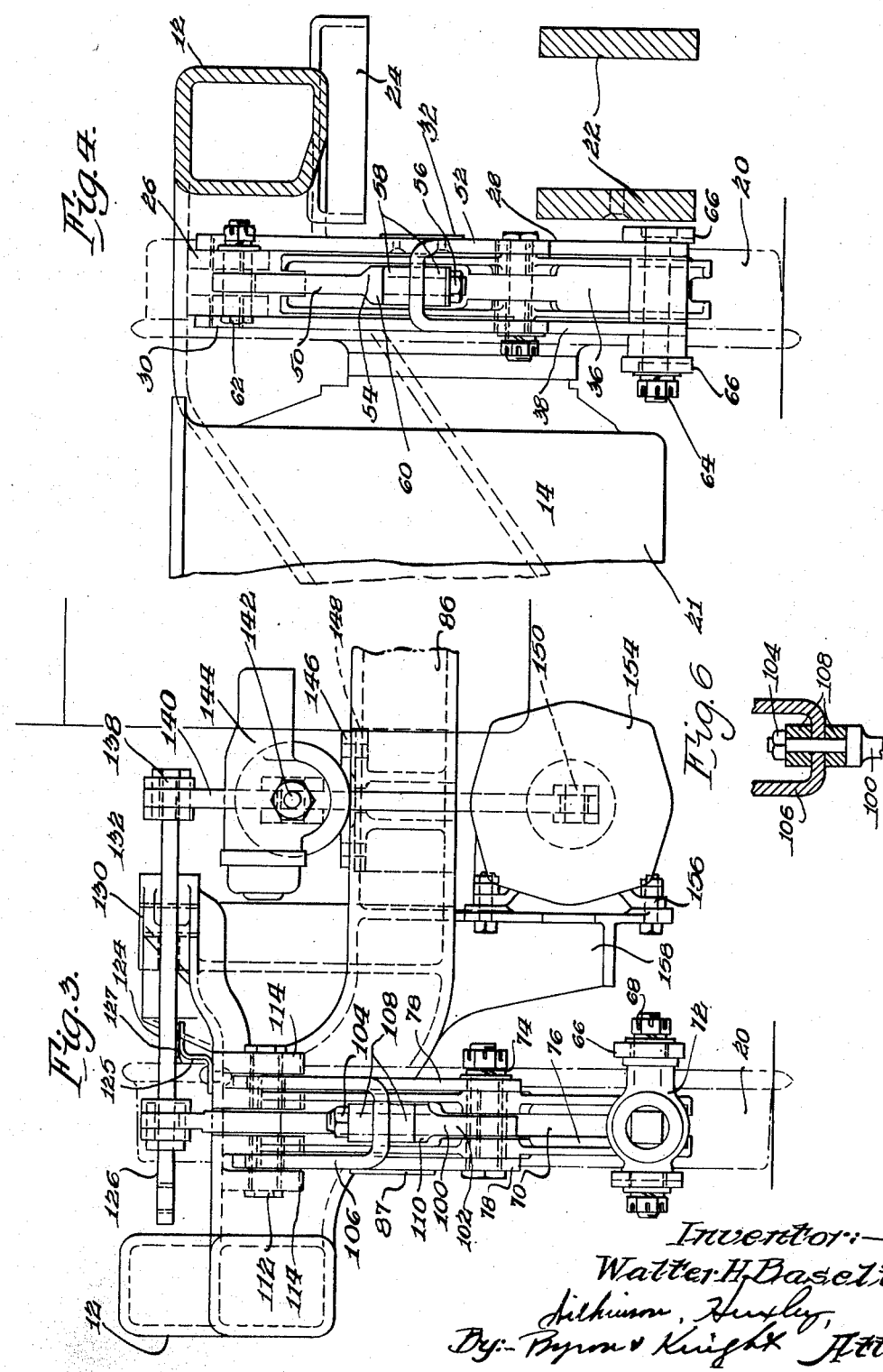
Inventor:—
Walter H. Baselt Patented Feb. 21, 1939

2,148,365

UNITED STATES PATENT OFFICE 2,148,365

BRAKE ARRANGEMENT

Walter H. Baselt, Chicago, Ill., assignor to American Steel Foundries, Chicago, Ill., a corporation of New Jersey Application December 9, 1936, Serial No. 115,038

27 Claims. (Cl. 188—56)

This invention pertains to brake mechanism for railway rolling stock, and more particularly to a unit cylinder clasp brake for motor trucks.

It is an object of this invention to provide a brake arrangement for motor trucks of low center of gravity wherein adequate clearances are maintained.

Another object is to provide a brake arrangement for a high speed motor truck wherein the brake shoes always engage the wheel periphery over the entire surface of said shoes.

A further object is to provide a unit cylinder clasp brake system applicable to each wheel of a truck.

A yet further object is to provide a unit cylinder brake system for a truck which is compact and is disposed to provide a maximum of space between side frames.

A still further object is to provide a unit cylinder clasp brake for each wheel of a motor truck which is simple in construction, inexpensive to make and maintain, and fulfills all requirements of manufacture and service.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary top plan view of the brake arrangement applied to one wheel of a motor truck;

Figure 2 is a fragmentary side elevation of the truck and brake construction illustrated in Figure 1;

Figure 3 is a fragmentary end elevation of the truck and brake construction illustrated in Figures 1 and 2;

Figure 4 is a sectional elevation taken substantially in the plane of the transverse center line of the truck construction illustrated in Figures 1 and 2;

Figure 5 is a view in cross-section taken in a plane represented by line 5—5 of Figure 1 of the drawings; and Figure 6 is a fragmentary view partly in elevation and partly in section of the two-part balance hangers used in the embodiment shown in the drawings.

Inasmuch as the truck and brake constructions are the same for each wheel of the four-wheel truck illustrated, the description herein will only be made as applied to one wheel.

In the truck construction illustrated, the truck frame 10 includes the side frame 12, the side frames at opposite sides of the truck being connected by spaced transoms 14, the bracket 16 being disposed at the junction of said transom and side frame, the spaced transoms being adapted to accommodate a suitable bolster (not shown). The side frames are provided with the spaced pedestals 18 adapted to accommodate suitable journal means (not shown) of the wheel and axle assemblies 20. Inasmuch as the trucks shown are particularly adapted for motor trucks, the motors may be disposed between the wheels, and between a transom and the adjacent end of the truck, such as shown at 21. The journal means on each side frame are engaged by the spaced equalizers 22, the usual coil springs (not shown) being disposed between said equalizers and the spring seat 24 provided on said side frame. The bracket 16 is provided with the depending bracket members 26, and the spaced hanger levers 28 are disposed substantially in the plane of the wheel 20, being pivotally connected to the bracket members 26 as at 30, the outer of said hanger levers being provided with the wear plate 32. The springs 33 are preferably provided on the dead hanger levers so that the brake head will follow the wheel as said wheel moves over track irregularities, and the bushings for the pivots 30 are flared on each side as at 35 to permit this following action. Referring more particularly to Figure 5 of the drawings, the following action is accomplished by providing the bushings 37 and 39 in the spaced hanger levers 28 of flared construction, which bushings are received by the pivot 30.

The hanger levers 28 are pivotally connected intermediate their ends as at 34 to the inner brake head 36, said brake head being provided with a plurality of brake shoes 38 and 40 keyed to said head as at 42 and 44. The head is also provided with the extension 46 pivoted as at 48 to the inner balance hanger 50. The balance hanger is preferably made in two parts, the lower U-shaped member 52 being resiliently connected to the upper member 54 by means of the connection 56. Resilient means such as rubber blocks 58 are disposed between the connection 56 and the U-shaped member 52 and the shoulders 60 of the member 54. The upper member 54 of the balance hanger 50 is pivotally connected as at 62 to the bracket member 26 so that with this construction the brake head is constrained to always have a parallel motion to thus insure a complete surface contact between the shoes 38 and 40 and the periphery of the wheel.

The lower ends of the hanger levers 28 are adjustably and pivotally connected as at 64 to the pull rods or spaced connecting straps 66 disposed on each side of the adjacent wheel, the opposite end of said straps being pivoted as at 68 to the lower end of the live truck lever 70 through the manually operable slack adjuster 72. The truck lever 70 is pivotally connected as at 74 to the brake head 76, and to the lower end of the brake hangers 78, the upper end of said brake hangers being pivotally connected as at 80 to the depending bracket members 82 provided on the bracket 84 disposed between the side frame and the end connecting members 86 connecting opposite side frames, the outer of said brake hangers having the wear pieces 87 applied thereto.

The outer brake head 76 is similar to the inner brake head 36, being provided with the lower and upper brake shoes 88 and 90 suitably connected to the head by means of the keys 92 and 94. The head is likewise provided with the extension 96 pivotally connected as at 98 to the outer balance hanger 100. Said balance hanger is also made in two parts, the lower member 102 being resiliently connected as at 104 to the upper U-shaped member 106, resilient blocks 108 being disposed between the shoulder 110 of the member 102, and the U-shaped member, and between the connection 104, and said U-shaped member. The upper U-shaped member is pivotally connected as at 112 to the depending bracket members 114 provided on the bracket 84.

The upper end of the truck lever 70 extends through a suitable slot 116 in the bracket 84 and is pivotally connected as at 118 to the clevis 120, said clevis being pivotally connected as at 122 to the substantially horizontally disposed auxiliary lever 124 adjacent the outer end thereof. The auxiliary lever 124 is provided with the extension 126 which is connected as at 128 to hand brake operating means. The auxiliary lever 124 extends inwardly and is supported on the bracket 125 through the wear piece 127 provided on said bracket. The lever 124 is pivoted intermediate the ends thereof as at 130 to the bracket 132 disposed between the bracket 84 and the end connecting member, and the inner end of said auxiliary lever is pivotally connected as at 134 to the clevis 136, said clevis being pivotally connected as at 138 to the upper end of the vertically disposed dead cylinder lever 140.

The cylinder lever extends through and is pivotally connected intermediate the ends thereof as at 142 to the automatic slack adjuster 144, said slack adjuster being supported as at 146 on the inwardly extending bracket 148 provided on the end connecting member 86. The lower end of the dead cylinder lever 140 is pivotally connected as at 150 to the piston 152 of the horizontally disposed operating cylinder 154, said cylinder being supported as at 156 on the depending bracket 158 provided on the end connecting member 86. Instead of using a hand brake connection as at 128, the clevis 136 may be pivotally connected by the link 160 to the rod 162, the outer end of said rod being loosely connected as at 164 to the adjacent end of the equalizer bar 166, which equalizer is suitably connected as at 168 to hand brake operating means 170.

Assuming the brakes to be in released position, when it is desired to apply said brakes, brake fluid, such as compressed air, is introduced to the cylinder 154. The piston 152 moves inwardly, or in the direction of the wheel, causing the dead cylinder lever to be moved in a clockwise direction. Movement of the cylinder lever in a clockwise direction, as viewed in Figure 2, causes the auxiliary lever 124 to be moved in a clockwise direction as viewed in Figure 1. Movement of the auxiliary lever 124 in a clockwise direction causes the truck lever 70 to be moved toward the left as viewed in Figure 2 to apply the brake shoes 88 and 90 to the periphery of the wheel, the movement of said shoes being a parallel movement to cause complete engagement over the entire surface regardless of the braking pressure. Continued movement of the truck lever 70 causes the connecting straps 66 to move the hanger levers 28 in a counter-clockwise direction about the pivot 30 applying the shoes 38 and 40 to the periphery of the wheel. The movement of said shoes is likewise in parallel for surface contact thereof. Release of the brake rigging is of course in a direction opposite to that described.

When the hand brake mechanism 128 or 170 is used, a similar operation is effected, as the movement of said brake mechanism 128 is toward the left as viewed in Figure 1, and movement of the equalizer bar 166 causes movement of the inner end of lever 124, causing a clockwise movement of said auxiliary lever 124 about the pivot 130.

Reference has been made heretofore to the flared construction of the bushings 37 and 39 at the pivot 30 for the spaced hanger levers 28 in order that the brake head will follow the wheel as the wheel moves over track irregularities. It is also contemplated that the bushings intermediate the ends of the levers 28 at pivot 34, as well as the bushings at the ends of brake hangers 78 at the pivot points 80 and at 74, be of similar construction, this being desirable in that the brake heads 36 and 76 with the two brake shoes therefor cover a rather large arc on the wheel, and it is therefore important to provide a greater amount of play than is normally required and which is usually provided in the connection between the journal box and the journal end of the axle, as well as in the various connections of the brake assembly, so that the brake shoes will follow the wheel and not be displaced therefrom as a result of relative movement between the wheel and axle assembly and the truck.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, a horizontally disposed auxiliary lever pivoted intermediate the ends thereof to said truck frame and adjacent the outer end thereof to the upper end of said truck lever, a vertically disposed dead cylinder lever pivoted adjacent the upper end thereof to the inner end of said auxiliary lever, an automatic slack adjuster supported on said truck frame and pivotally connected to said cylinder lever intermediate the ends thereof, a horizontally disposed brake cylinder supported on said truck frame and provided with a piston pivotally connected to the lower end of said cylinder lever, said piston operating in a direction inboard of said truck frame to apply said brakes, said auxiliary lever being provided with an outward extension, and auxiliary brake operating means connected to said extension.

2. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, a horizontally disposed auxiliary lever pivoted intermediate the ends thereof to said truck frame and adjacent the outer end thereof to the upper end of said truck lever, a vertically disposed dead cylinder lever pivoted adjacent the upper end thereof to the inner end of said auxiliary lever, an automatic slack adjuster supported on said truck frame and pivotally connected to said cylinder lever intermediate the ends thereof, a horizontally disposed brake cylinder supported on said truck frame and provided with a piston pivotally connected to the lower end of said cylinder lever, said piston operating in a direction inboard of said truck frame to apply said brakes.

3. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, a horizontally disposed auxiliary lever pivoted intermediate the ends thereof to said truck frame and adjacent the outer end thereof to the upper end of said truck lever, a vertically disposed dead cylinder lever pivoted adjacent the upper end thereof to the inner end of said auxiliary lever, an automatic slack adjuster supported on said truck frame and pivotally connected to said cylinder lever intermediate the ends thereof, and a horizontally disposed brake cylinder supported on said truck frame and provided with a piston pivotally connected to the lower end of said cylinder lever.

4. In a brake arrangement, the combination of a truck frame having pivot apertures, a wheel, a brake head disposed adjacent the periphery of said wheel for braking cooperation therewith, and a brake lever pivotally connected to said brake head, said brake lever being pivotally connected to said truck frame, the pivot apertures in said truck frame being flared toward the pivot ends, the connection to said truck frame being through a pivot member resiliently restricted in longitudinal movement of said pivot.

5. In a brake arrangement, the combination of a truck frame, brake mechanism, operating means for said brake mechanism, said operating means including a substantially horizontally disposed dead auxiliary lever pivoted adjacent the ends thereof to said brake mechanism, said auxiliary lever being pivoted intermediate the ends thereof to said truck frame, an operating cylinder supported on said truck frame, connecting means between the piston of said cylinder and the other end of said auxiliary lever, and hand brake operating means connected to said last named end of said auxiliary lever, said hand brake operating means including an equalizer bar loosely connected to means connected to said end of said auxiliary lever.

6. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever, inner and outer brake heads respectively connected to said hanger and truck levers intermediate the ends thereof for braking cooperation with said wheel, a horizontally disposed auxiliary lever pivoted intermediate the ends thereof to said truck frame and adjacent the outer end thereof to the upper end of said truck lever, a vertically disposed dead cylinder lever pivoted adjacent the upper end thereof to the inner end of said auxiliary lever, an automatic slack adjuster supported on said truck frame and pivotally connected to said cylinder lever intermediate the ends thereof, and a horizontally disposed brake cylinder supported on said truck frame and provided with a piston pivotally connected to the lower end of said cylinder lever.

7. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever, said connection including a strap pivoted adjacent the inner end thereof to said hanger lever and adjacent the outer end thereof to said truck lever through a manual slack adjuster, inner and outer brake heads respectively connected to said hanger and truck levers intermediate the ends thereof for braking cooperation with said wheel, a brake hanger pivoted adjacent one end to said truck lever at the pivotal connection of the brake head thereto and pivoted adjacent the opposite end to said truck frame, a horizontally disposed auxiliary lever pivoted intermediate the ends thereof to said truck frame and adjacent the outer end thereof to the upper end of said truck lever, a vertically disposed dead cylinder lever pivoted adjacent the upper end thereof to the inner end of said auxiliary lever, an automatic slack adjuster supported on said truck frame and pivotally connected to said cylinder lever intermediate the ends thereof, and a horizontally disposed brake cylinder supported on said truck frame and provided with a piston pivotally connected to the lower end of said cylinder lever.

8. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, a horizontally disposed auxiliary lever pivoted intermediate the ends thereof to said truck frame and adjacent the outer end thereof to the upper end of said truck lever, a vertically disposed cylinder lever pivoted to said frame and being pivotally connected adjacent the upper end thereof to the inner end of said auxiliary lever, and a horizontally disposed brake cylinder supported on said truck frame and provided with a piston pivotally connected to said cylinder lever.

9. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, a brake hanger pivoted adjacent one end to said truck lever at the pivotal connection of the brake head thereto and pivoted adjacent the opposite end to said truck frame, a horizontally disposed auxiliary lever pivoted intermediate the ends thereof to said truck frame and adjacent the outer end thereof to the upper end of said truck lever, a vertically disposed cylinder lever pivoted to said frame and being pivotally connected adjacent the upper end thereof to the inner end of said auxiliary lever, and a horizontally disposed brake cylinder supported on said truck frame and provided with a piston pivotally connected to said cylinder lever.

10. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, a brake hanger pivoted adjacent one end to said truck lever at the pivotal connection of the brake head thereto and pivoted adjacent the opposite end to said truck frame, a horizontally disposed auxiliary lever pivoted intermediate the ends thereof to said truck frame and adjacent the outer end thereof to the upper end of said truck lever, a vertically disposed cylinder lever pivoted to said frame and being pivotally connected adjacent the upper end thereof to the inner end of said auxiliary lever, and a horizontally disposed brake cylinder supported on said truck frame and provided with a piston pivotally connected to said cylinder lever.

11. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, a brake hanger pivoted adjacent one end to said truck lever at the pivotal connection of the brake head thereto and pivoted adjacent the opposite end to said truck frame, and brake operating means connected to the upper end of said truck lever.

12. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, a brake hanger pivoted adjacent one end to said truck lever and pivoted adjacent the opposite end to said truck frame, and brake operating means connected to the upper end of said truck lever.

13. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, said balance hangers being formed in a plurality of parts resiliently connected, a brake hanger pivoted adjacent one end to said truck lever at the pivotal connection of the brake head thereto and pivoted adjacent the opposite end to said truck frame, and brake operating means connected to the upper end of said truck lever.

14. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, a brake hanger pivoted adjacent one end to said truck lever at the pivotal connection of the brake head thereto and pivoted adjacent the opposite end to said truck frame, and a brake operating cylinder operatively connected to the upper end of said truck lever.

15. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, a brake hanger pivoted adjacent one end to said truck lever at the pivotal connection of the brake head thereto and pivoted adjacent the opposite end to said truck frame, and a brake operating cylinder operatively connected to the upper end of said truck lever.

16. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, a brake hanger pivoted adjacent one end to said truck lever at the pivotal connection of the brake head thereto and pivoted adjacent the opposite end to said truck frame, and a horizontally disposed brake operating cylinder connected to and disposed beneath said frame and operatively connected to the upper end of said truck lever.

17. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, a brake hanger pivoted adjacent one end to said truck lever and pivoted adjacent the opposite end to said truck frame, and a horizontally disposed brake operating cylinder connected to and disposed beneath said frame and operatively connected to the upper end of said truck lever.

18. In a brake arrangement, the combination of a truck frame, a wheel disposed in supporting relation thereto, brake mechanism for said wheel, brake operating means for said mechanism including a horizontally disposed brake cylinder connected to and disposed beneath said frame, a vertically disposed cylinder lever operated by said cylinder and operatively connected to said mechanism, and an automatic slack adjuster supported on said frame and pivotally connected to said cylinder lever intermediate the ends thereof.

19. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to said truck frame, a brake hanger pivoted adjacent one end to said truck lever at the pivotal connection of the brake head thereto and pivoted adjacent the opposite end to said truck frame, brake operating means operatively connected to said live truck lever, said means including a brake cylinder, a cylinder lever operated by said cylinder and operatively connected to said live truck lever, and an automatic slack adjuster pivotally connected to said cylinder lever intermediate the ends thereof.

20. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, a brake hanger pivoted adjacent one end to said truck lever at the pivotal connection of the brake head thereto and pivoted adjacent the opposite end to said truck frame, brake operating means operatively connected to said live truck lever, said means including a brake cylinder, a vertically disposed cylinder lever operated by said cylinder and operatively connected to said live truck lever, and an automatic slack adjuster supported on said frame and pivotally connected to said cylinder lever intermediate the ends thereof.

21. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, a brake hanger pivoted adjacent one end to said truck lever at the pivotal connection of the brake head thereto and pivoted adjacent the opposite end to said truck frame, brake operating means operatively connected to said live truck lever, said means including a horizontally disposed brake cylinder connected to and disposed beneath said frame, a vertically disposed cylinder lever operated by said cylinder and operatively connected to said live truck lever, and an automatic slack adjuster supported on said frame and pivotally connected to said cylinder lever intermediate the ends thereof.

22. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, a brake hanger pivoted adjacent one end to said truck lever at the pivotal connection of the brake head thereto and pivoted adjacent the opposite end to said truck frame, brake operating means operatively connected to said live truck lever, said means including a brake cylinder, a cylinder lever operated by said cylinder and operatively connected to said live truck lever, and an automatic slack adjuster pivotally connected to said cylinder lever intermediate the ends thereof.

23. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, a brake hanger pivoted adjacent one end to said truck lever and pivoted adjacent the opposite end to said truck frame, brake operating means operatively connected to said live truck lever, said means including a brake cylinder, a vertically disposed cylinder lever operated by said cylinder and operatively connected to said live truck lever, and an automatic slack adjuster supported on said frame and pivotally connected to said cylinder lever intermediate the ends thereof.

24. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, a brake hanger pivoted adjacent one end to said truck lever at the pivotal connection of the brake head thereto and pivoted adjacent the opposite end to said truck frame, brake operating means operatively connected to said live truck lever, said means including a horizontally disposed brake cylinder connected to and disposed beneath said frame, a vertically disposed cylinder lever operated by said cylinder and operatively connected to said live truck lever, and an automatic slack adjuster supported on said frame and pivotally connected to said cylinder lever intermediate the ends thereof.

25. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, said balance hangers being formed in a plurality of parts resiliently connected, a brake hanger pivoted adjacent one end to said truck lever at the pivotal connection of the brake head thereto and pivoted adjacent the opposite end to said truck frame, brake operating means operatively connected to said live truck lever, said means including a brake cylinder, a cylinder lever operated by said cylinder and operatively connected to said live truck lever, and an automatic slack adjuster pivotally connected to said cylinder lever intermediate the ends thereof.

26. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, said balance hangers being formed in a plurality of parts resiliently connected, a brake hanger pivoted adjacent one end to said truck lever at the pivotal connection of the brake head thereto and pivoted adjacent the opposite end to said truck frame, brake operating means operatively connected to said live truck lever, said means including a brake cylinder, a vertically disposed cylinder lever operated by said cylinder and operatively connected to said live truck lever, and an automatic slack adjuster supported on said frame and pivotally connected to said cylinder lever intermediate the ends thereof.

27. In a brake arrangement, the combination of a truck frame, a wheel disposed in supporting relation thereto, an inner dead hanger lever pivoted to said truck frame and disposed in the plane of said wheel, an outer live truck lever disposed in the plane of said wheel, a connection between said hanger lever and said truck lever disposed below the wheel center, inner and outer brake heads respectively connected to said hanger and truck levers intermediate the ends thereof for braking cooperation with said wheel, balance hangers pivoted adjacent the lower end thereof to each of said brake heads and adjacent the upper end thereof to said truck frame, said balance hangers being spaced from said hanger and truck levers to cause substantial parallel movement of said brake heads, said balance hangers being formed in a plurality of parts resiliently connected, a brake hanger pivoted adjacent one end to said truck lever at the pivotal connection of the brake head thereto and pivoted adjacent the opposite end to said truck frame, brake operating means operatively connected to said live truck lever, said means including a horizontally disposed brake cylinder connected to and disposed beneath said frame, a vertically disposed cylinder lever operated by said cylinder and operatively connected to said live truck lever, and an automatic slack adjuster supported on said frame and pivotally connected to said cylinder lever intermediate the ends thereof.

WALTER H. BASELT.